United States Patent [19]
Janzén et al.

[11] Patent Number: 4,893,354
[45] Date of Patent: Jan. 9, 1990

[54] SYSTEM AND METHOD FOR SELF-COMPENSATING FIBER-OPTIC DATA TRANSMISSION AT TEMPERATURES UP TO 200 DEGREES C.

[75] Inventors: Erik Janzén; Rune Tenghamn, both of Västerås, Sweden

[73] Assignee: AB ASEA-Atom, Sweden

[21] Appl. No.: 117,534

[22] Filed: Nov. 6, 1987

[30] Foreign Application Priority Data
Nov. 7, 1986 [SE] Sweden ............................ 8604792

[51] Int. Cl.4 .............................................. H04B 9/00
[52] U.S. Cl. .................................... 455/612; 250/256; 340/854; 455/600; 455/617
[58] Field of Search ............... 455/600, 610, 612, 613, 455/617, 618; 370/3; 372/32, 28, 36; 340/853, 854; 367/81; 250/256

[56] References Cited
U.S. PATENT DOCUMENTS

| | | | |
|---|---|---|---|
| 4,243,952 | 1/1981 | Patterson | 372/34 |
| 4,443,890 | 4/1984 | Eumurian | 455/617 |
| 4,485,475 | 11/1984 | Large et al. | 372/32 |
| 4,547,774 | 10/1985 | Gould | 455/612 |
| 4,609,873 | 9/1986 | Cox et al. | 340/854 |

Primary Examiner—Robert L. Griffin
Assistant Examiner—L. Van Beek
Attorney, Agent, or Firm—Watson, Cole, Grindle & Watson

[57] ABSTRACT

Data logging at temperatures up to 200° C. by optical signals sent via a "wet" optical fiber is achieved by using as a light source device an LED having a peak amplitude wavelength at ambient temperature which is sufficiently removed from 1390 Å so that acceptable transmission levels can pass through the fiber when the wavelength/temperature shift of the LED is allowed for.

9 Claims, 3 Drawing Sheets

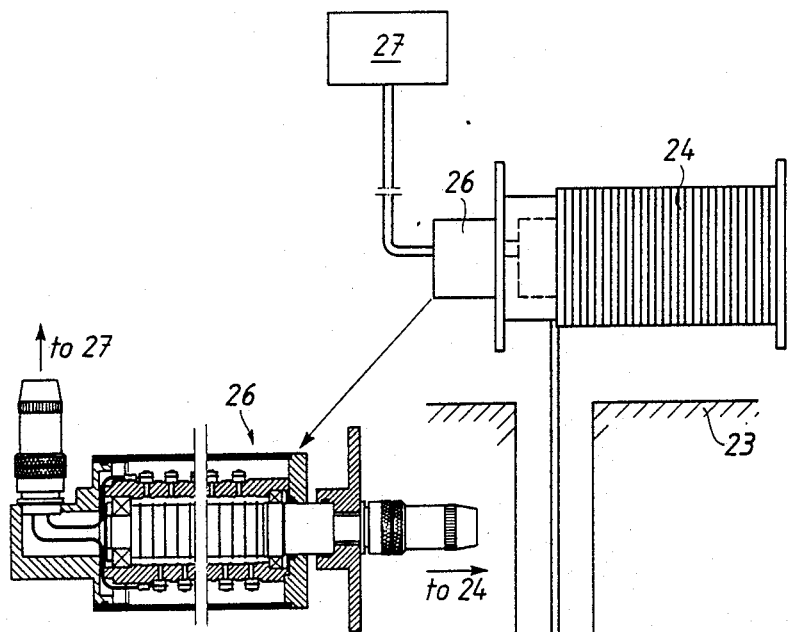
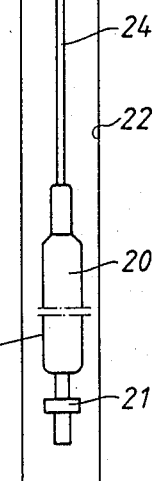
FIG. 6
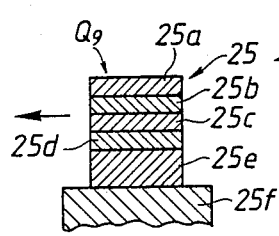
FIG. 7
FIG. 5

SYSTEM AND METHOD FOR SELF-COMPENSATING FIBER-OPTIC DATA TRANSMISSION AT TEMPERATURES UP TO 200 DEGREES C.

TECHNICAL FIELD

The present invention relates to a system for self-compensating fiber-optic data transmission at temperatures of up to 200° C., for example for use in bore hole logging.

BACKGROUND ART

A system for optical data transmission comprises essentially an optical transmitter with a power supply means for a light source device, which may be a light emitting diode (LED), an optical fiber which may be armoured to withstand high pressures and tensile stresses, and an optical receiver for detecting light pulses. The temperature characteristic of an LED produces a displacement of the emitted wavelength at increasing temperature. For a standard LED of 1300 Å wavelength at ambient temperature, the wavelength is displaced to longer wavelengths at increasing temperatures, and at the same time the amplitude (or intensity) of the emitted radiation for the same level of input electrical power reduces with increasing temperature.

In addition to the problem caused by the reduced intensity of emitted light at high temperatures, water in the fiber environment may cause OH ions to be absorbed into the fiber, and these produce characteristic absorption peaks at 1240 Å and 1390 Å. The "water" absorption in the fiber will invariably increase with time, particularly in harsh operating conditions (i.e., high temperatures and pressures). The above-mentioned facts have not made it possible heretofore to reliably transmit light at temperatures of 200° C. over long distances under water. The present invention seeks to make such optical transmissions possible.

SUMMARY OF THE INVENTION

According to one aspect of the invention, in a method of conveying data from a first location at a variable temperature to a second location remote from the first location via an optical fiber extending between these locations by optical signals generated by a data transmitter at the first location, the optical fiber having a variable attenuation/wavelength characteristic which shows a maximum attenuation at a given peak attenuation wavelength, there is provided the improvement of using as the source device of the optical signals in the data transmitter a source device whose temperature/wavelength characteristic is such that at the temperature of the first location, the emitted wavelength is spaced from the peak attenuation frequency of the fiber.

In a further aspect there is provided a method of bore hole logging which includes locating a data transmitter, including a source device generating optical signals and a power unit therefor, down a bore hole, connecting the data transmitter to an optical signal receiving unit at the surface by an umbilical which includes an optical fiber and at least one electrically-conducting lead for the supply of electrical power to the power unit, which is characterized in that in order to permit operation at temperatures up to 200° C., the source device is selected to have a temperature/wavelength characteristic which is related to the wavelength/attenuation characteristic of the optical fiber so that at no temperature in the range 100° to 200° C. does the output wavelength of the source device correspond to the highest peak of the wavelength/attenuation characteristic of the fiber.

A still further aspect provides a self-compensating fiber-optic data transmission system for use at temperatures from ambient to 200° C. and at high pressure, comprising a light source device adapted to emit light with a wavelength greater than 1100 Å, an armoured cable including an optical fiber having a head end and an upper end for the transmission of light, for example, in connection with bore hole logging for communication between the head end in a bore hole and the upper end at a surface position, with contacts at the head end for connection to the light source device, a drive unit for control of the light source device, and a receiver for receiving the light signals from the light source device at the upper end of the cable, which is characterized in that the light source device is adapted for continuous operation to the fiber in such a way that the wavelength displacement occurring due to changing temperature matches a low intensity output of the light source device with low attenuation of the fiber in the temperature range 100° to 200° C.

A particularly suitable light source device is an LED of the InP type (e.g., the LED includes a plurality of different composition epitaxial layers grown on a substrate, each layer having the composition $In_xGa_{1-x}As_yP_{1-y}$).

BRIEF DESCRIPTION OF THE DRAWINGS

The invention will now be more fully described, by way of example, with reference to the accompanying drawings in which:

FIG. 5 shows a system in accordance with the invention for bore hole logging, and FIGS. 6 and 7 are enlarged sectional views of component parts of the system of FIG. 5.

DESCRIPTION OF PREFERRED EMBODIMENTS OF THE INVENTION

To be able to transmit data via a fiber optic link from a measuring point at a temperature of 200° C. over large distances of up to 7.5 km through an environment where the fiber, may possibly be subjected to the combined influence of moisture and pressure (which may lead to water absorption in the fiber) a completely new system solution is required.

The invention relates to such a system solution which proposes the use of a self-compensating system which has a minimum attenuation from the fiber when the light intensity is at a minimum. Using a novel system based on this matching of minima, it is possible to transmit data by means of fiber optics at a temperature of 200° C. over long underwater distances. A data transmitting means emitting light at a wavelength of about 1180 Å at ambient temperature has been considered to be the most suitable for the system solution mentioned above. The data transmitting means may be an LED, and an edge-emitting LED (e.g., mounted on a diamond to improve the rate of thermal dissipation) is particularly preferred.

The substrate of a preferred LED is of InP type on which epitaxial layers of $In_xGa_{1-x}As_yP_{1-y}$ have been grown with a varying composition from layer to layer. The various layers form a double heterostructure, which provides a high efficiency. However, the active layer of such an LED (i.e., the layer in which electrons and holes are recombined and from which the photons are emitted), has a band gap whose width varies with temperature and composition. The energy of the photon emitted from the active layer is approximately equal to the width of the band gap. To avoid operating at the absorption peak of a "wet" fiber (i.e., at 1390 Å), the composition of the active layer of the LED should be chosen such that the wavelength of the emitted light at 200° C. is less than 1390 Å.

Figure 1:
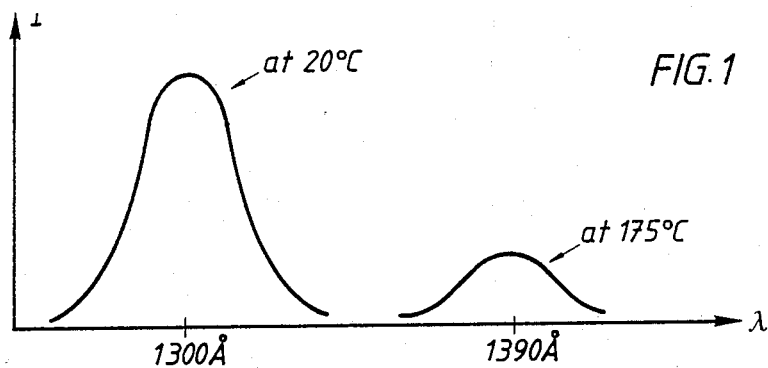
FIG. 1 shows the change in the intensity/wavelength distribution of a typical LED caused by a rise in operating temperature.

FIG. 1 shows the intensity/wavelength distribution of a typical LED at two temperatures of 20° C. (ambient) and 175° C. At the lower temperature, the peak intensity of emitted light occurs at 1300 Å but at the higher temperature the peak intensity (which is considerably reduced compared to that applying at ambient temperature) is shifted to a longer wavelength of 1390 Å.

Figure 2:
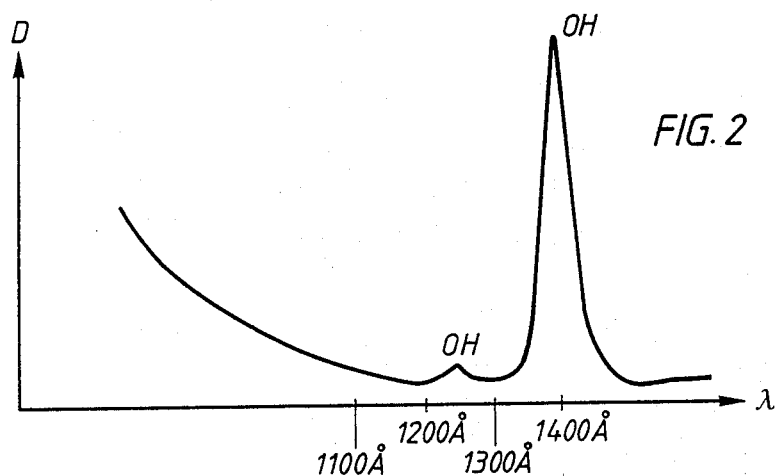
FIG. 2 shows the attenuation/wavelength characteristic of a "wet" optical fiber.

FIG. 2 shows the attenuation (D)/wavelength characteristic of a typical "wet" vitreous silica fiber which demonstrates a high absorption peak at 1390 Å and a lower (but evident) peak at 1240 Å.

The invention concerns matching the characteristics of FIG. 1 with those of FIG. 2, to obtain a system where an acceptable intensity of emitted light is available at all temperatures in the range 20° to 200° C. (and particularly 100° C. to 200° C.).

Figure 3:
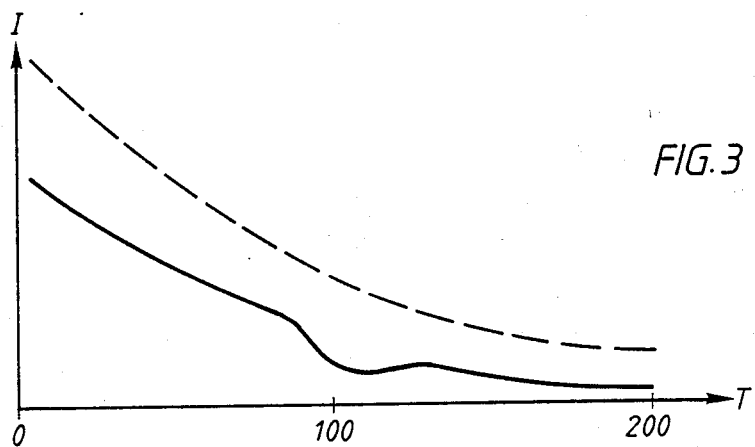
FIG. 3 is a plot of signal intensity (I) against temperature (T) for a fiber optic data transmission system in accordance with the invention.

FIG. 3 shows, in dotted line the intensity/temperature characteristic of a preferred form of LED and in full line the intensity/temperature characteristic of the output from such a diode after transmission through an optical fiber in the range 1100 Å to 1300 Å showing the effect (in the illustrated case centered around 100° C.) of the OH peak at 1240 Å. This absorption peak provides a limited reduction in the intensity but is not particularly significant to the overall operation of the system. By emitting light at 1300 Å at a temperature of 200° C., a minimum attenuation at the lowest intensity is obtained. It can be established that, in the case of transmission in the temperature interval 0° to 200° C., the absorption peak of 1240 Å, which occurs at about 100° C., influences the received signal together with the temperature-dependent intensity, so that one obtains a degree of temperature-compensation in the temperature range 100° to 200° C.

A further improvement can be obtained if the power supply to the light source device is temperature-compensated for temperatures in the range ambient to 200° C. Desirably, therefore, a voltage regulator of the power supply unit is designed to have a positive temperature coefficient which is as small as possible.

Figure 4:
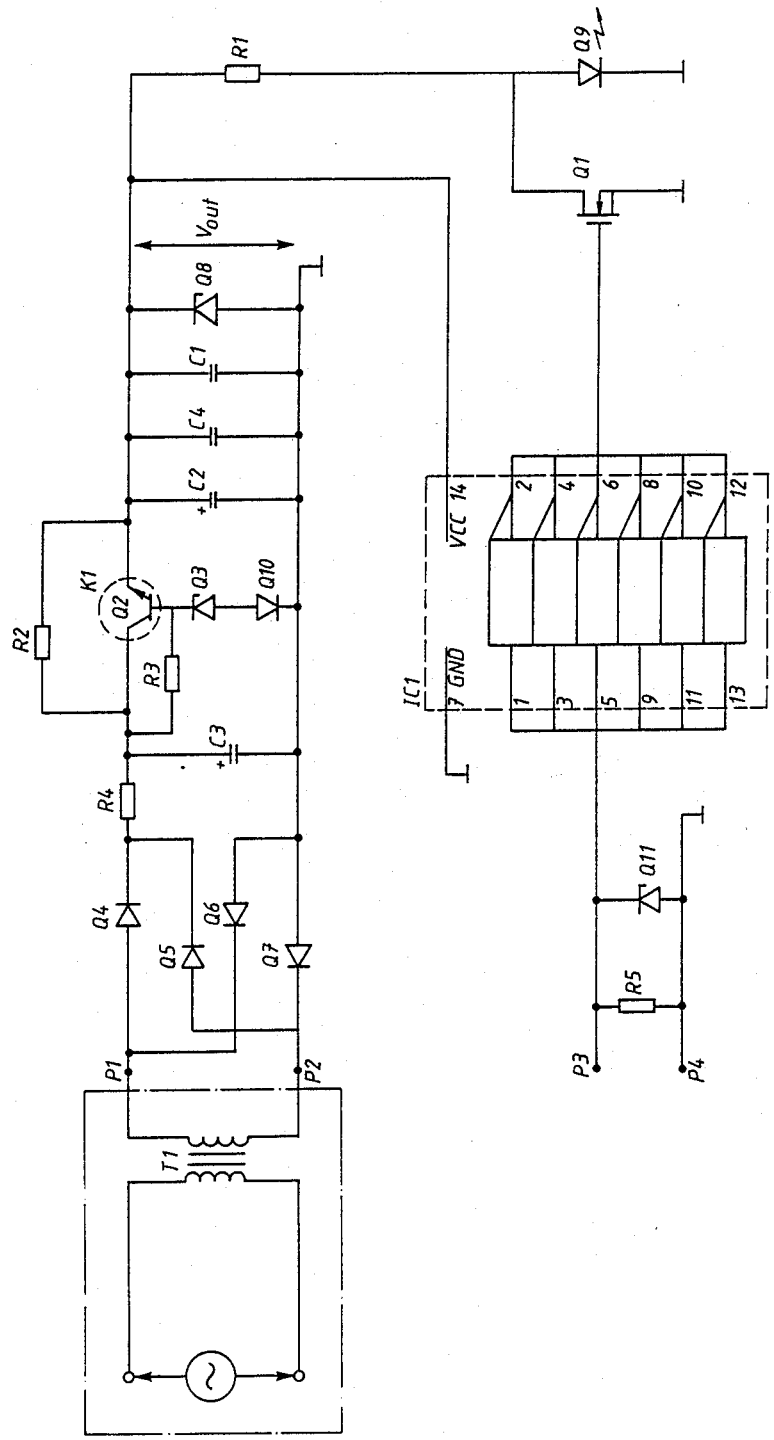
FIG. 4 is a circuit diagram of a power supply unit for a light source device for use in the method and system of the invention.

FIG. 4 shows one form of power supply unit for feeding an LED (shown at Q9 in FIG. 4). An AC supply X (which could be 50 or 60 cps and 140 to 250 volts) feeds the primary coil of a step-down transformer T1, the secondary coil of which is connected to terminals P1 and P2 of a full wave rectifier bridge Q4, Q5, Q6 and Q7. The transformer is shown located in a chain-line box since this can be remote from the rest of the circuit shown in FIG. 4 which could be located down a bore hole. Initial smoothing of the DC output from the rectifier bridge Q4–Q7 is effected by R4, C3 and further removal of residual ripple by C2, C4 and C1 producing an output voltage $V_{out}$ across a Zener diode Q8. R4 also acts to limit the current through Q8 in the event of a voltage short occurring.

Transistor Q2, Zener diode Q3 and diode Q10 together define a temperature compensated voltage regulator K1, R3 setting the Zener current through Q3. When the input voltage is high, Q2 would tend to dissipate too much power and thus a limiting resistor R2 is provided to take about 70% of the load current at maximum input voltage. R1 is used to limit the LED current to a maximum safe figure and the regulator circuit K1 causes an increase in the electrical power fed to Q9 to provide a measure of compensation for the natural decrease in intensity of light output with increasing temperature (shown in FIG. 1).

In a preferred form of power supply unit $V_{out}$ is approximately 4.7 V. With a forward voltage drop for the LED Q9 of 1.5 V-380 ppm/°C., the voltage across R1 becomes 3.20 V at 20° C. and 3.44 V at 200° C., which gives a current change through Q9 of from 97 mA to 104 mA, i.e., an increase of the current to the LED of about 7%, which to a certain extent counteracts the intensity reduction of the LED.

FIG. 5 shows a typical bore hole logging system in which a data transmitter 20 (e.g., the unit shown in FIG. 4) and associated transducer 21 are located down a bore hole 22 and linked to the surface 23 by an armoured fiber optic umbilical 24. The data transmitter 20 includes an LED (shown schematically at 25 in FIG. 7) which is modulated by data fed to it from the transducer 21. The transducer 21 can receive signals from tools located below it in the bore hole. At the surface a rotary connector is provided (shown at 26 in FIG. 6) which enables AC power to be fed down the umbilical 24 to the data transmitter 20 to energise the LED 25.

A receiver 27 is coupled to the connector 26 to receive the coded data signals and to interpret them into the information which is required concerning the downhole conditions.

FIG. 7 shows schematically an edge-emitting LED having a substrate 25e of InP type on which have been epitaxially grown different doped layers 25a–25c of $In_xGa_{1-x}As_yP_{1-y}$. A diamond 25f serves as a support for the active part of the LED.

The data signals from the transducer 21 are fed (see FIG. 4) to data input terminals P3, P4 via a termination resistor R5 (which matches the input impedance of the terminals P3, P4 to the data leads from 21) and an overvoltage protection diode Q11, and pass to an integrated circuit IC1 which serves as an input gate and a transistor driver for a fast switch FET Q1 that controls the input current to the LED.

From the foregoing it will be seen that by means of the invention light transmission at temperatures of up to 200° C. can be achieved with a system comprising a temperature-compensated current source, an LED and an optical fiber over lengths of up to 7.5 km and using one receiver. This system solution is especially suited for use in bore hole logging at great depths.

Although it is possible to manufacture a fiber (e.g., a vitreous silica fiber) which is completely "water free", after some time, OH ions will become trapped in the fiber. In connection with bore hole logging using fibre-optic data transmission with a transmitter unit placed in a cable head down in the bore hole, the fiber is subjected to an extreme environment involving great tensile stresses, the water being under a high pressure and having a high temperature. The high temperature results in a wavelength displacement of the light emitting diode, and therefore a standard light emitting diode of 1300 Å cannot be used since it will emit at a wavelength where the OH ions strongly attenuate the radiation.

By making the wavelength of the light emitting diode sufficiently low it is possible for the wavelength displacement, at high temperatures, not to reach 1390 Å or not to exceed 1300 Å, which means that the OH absorption peak will not affect the attenuation at high temperatures. Attenuation and dispersion are relatively low at 1100 Å and above 1500 Å, respectively.

With a self-compensating system, which has a minimum attenuation from the fiber when the light intensity is at a minimum, it is possible to transmit data by fiber optics at a temperature of 200° C. over long underwater distances.

What is claimed is:

1. A method for self-compensating fiber-optic data transmission from a first location at temperatures from ambient to 200° C. at high pressure to a second location remote from the first location via an optical fiber extending between said first and second locations, said optical fiber having a variable attenuation/wavelength characteristic which shows a maximum attenuation at a given peak attentuation wavelength, said method comprising generating optical signals by a data transmitter at the first location having a source device of the optical signals whose temperature/wavelength characteristic is related to the wavelength/attenuation characteristic of the optical fiber so that at no temperature in a range of 100° to 200° C. does the output wavelength of the source device correspond to the highest peak of the wavelength/attenuation characteristic of the optical fiber.

2. A self-compensating fiber-optic data transmission system for use at temperatures from ambient to 200° C. and at high pressure, comprising
   a light source device adapted to emit light with a wavelength greater than 1100 A,
   an armoured cable including an optical fiber having a head end and an upper end for the transmission of light, for example in connection with bore hole logging for communication between the head end in a bore hole and the upper end at a surface position, with contacts at the head end for connection to the light source device,
   a drive unit for control of the light source device, and
   a receiver for receiving the light signals from the light source device at the upper end of the cable,
   wherein the light source device is adapted for continuous operation in such a way that at no temperature in the range 100°-200° C. does the output wavelength of the source device correspond to the highest peak of the wavelength/attenuation characteristic of the optical fiber.

3. An optical communication system according to claim 2, wherein the light source device is a light emitting diode (LED) and is placed in the cable head without means for cooling the LED.

4. An optical communication system according to claim 3, wherein the wavelength of the LED is chosen such that at no temperature in the range 100° C. to 200° C. is the wavelength of the LED 1390 Å.

5. An optical communication system according to claim 2, wherein the light source device is an LED having its peak intensity of emitted light at about 1180 Å at ambient temperature.

6. An optical communication system according to claim 5, wherein the light source device is an edge emitting LED which includes a plurality of different composition epitaxial layers grown on a substrate, each layer having the composition $In_xGa_{1-x}As_yP_{1-y}$.

7. A method of bore hole logging which includes locating a data transmitter which includes a source device generating optical signals and a power unit therefor down a bore hole, and connecting the data transmitter to an optical signal receiving unit at the surface by an umbilical which includes an optical fiber and at least one electrically-conducting lead for the supply of electrical power to the power unit, the source device being selected to have a temperature/wavelength characteristic which is related to the wavelength/attenuation characteristic of the optical fiber so that at no temperature in the range 100° to 200° C. does the output wavelength of the source device correspond to the highest peak of the wavelength/attenuation characteristic of the fiber.

8. A method as claimed in claim 7, wherein the power unit includes temperature compensating means so that in the temperature range 100° to 200° C. the electrical output power from the power unit increases with increasing temperature to at least partly compensate for a decreasing output optical power of the source device with increasing temperature.

9. A method as claimed in claim 8, wherein the source device comprises an LED emitting radiation of a wavelength of 1300 Å at 200° C.

* * * * *